Oct. 19, 1965 M. ÖVROM SEM 3,213,178
PROCESS OF CHARGING AND EXHAUSTING GAS FROM ELECTRIC
SMELTING FURNACES
Filed Aug. 10, 1962

INVENTOR.
MATHIAS ÖVROM SEM

United States Patent Office 3,213,178
Patented Oct. 19, 1965

3,213,178
PROCESS OF CHARGING AND EXHAUSTING GAS FROM ELECTRIC SMELTING FURNACES
Mathias Övrom Sem, Oslo, Norway, assignor to Elektrokemisk A/S, Radhusgaten, Oslo, Norway, a corporation of Norway
Filed Aug. 10, 1962, Ser. No. 216,159
6 Claims. (Cl. 13—33)

It is known that in open electric smelting furnaces for production of pig iron, carbide, ferro alloys and the like, the furnace gas can be collected by means of a bell-shaped gas housing positioned to surround each eectrode in spaced relationship and with the open bottom end of the housing facing the top opening of the furnace. The charge is supplied to the furnace from outside the housing and in content with it so that it covers the bottom edge of the housing and closes off the space between the bottom edge and the wall of the furnace. In this way air is prevented from being sucked in under the bottom edge of the container. Provided that the charge sinks uniformly downwards into the furnace during the smelting so that it all the time contacts and covers the exposed lower portion of the electrode, this arrangement gives good results. If, however, uniform sinking stops, for example on account of hanging and sintering of the charge, the smelting crater formed around the electrodes will be left more or less open so that the furnace gas will escape directly out from the crater through the openings instead of filtering through a layer of solid charge. This is called "blowing" of the furnace. By such blowing, the furnace gas will not give up its heat content to the charge and will escape from the open crater at such elevated temperatures that the furnace parts may be damaged. Furthermore, the powerful gas currents escaping out of the crater will carry off great amounts of dust. Both these factors will tend to increase the power consumption per ton of product.

These difficulties can be avoided by stoking the furnace as is practiced in usual open smelting furnaces. The stoking tools can, however, easily damage the gas housing and move it out of position, thus disturbing the furnace operation. Furthermore, stoking will usually have to be repeated a number of times during a smelting cycle and this adds to the cost of furnace operation.

A method has now been found by which the problems of hanging and sintering of the charge and of formation of open craters can be substantially avoided without having to resort to regular stoking. According to the new method of this invention, the charge is introduced into the furnace inside of the gas housing through the annular space formed between the wall of the housing and the exposed lower portion of the electrode. When the charge is introduced in this manner, a considerable portion of the exposed lower portion of the electrode will always be covered with charge and the pressure of the charge against the electrode will be greatly increased. As a result, the smelting crater formed between the tip of the electrode and the melt at the bottom of the furnace will remain covered with a layer of charge at all times and furnace gas will have to filter through this cover layer before it reaches the interior of the gas housing. Thus the heat content of the gas is advantageously transferred to the incoming charge to preheat the same and the gas is collected at relatively cool temperatures so that damage to the furnace parts is avoided. At the same time, the "blowing" problem mentioned hereinabove is virtually eliminated without having to stoke the charge regularly or otherwise disturb operation of the furnace.

In order to carry out the new method of the invention, a gas housing having a generally cylindrical side wall is suspended in spaced surrounding relationship around the lower portion of each electrode and equipped with one or more outlet pipes for exhausting furnace gas collected in the housing. The housing is provided with at least one charge shaft leading into the interior thereof for introducing charge into the annular space between the wall of the housing and the surface of the electrode. If desired, a plurality of charge shafts may be used to lead into an annular space in which case it is preferable to also use a plurality of gas outlet pipes and arrange the shafts and pipes in alternate positions along the wall of the housing.

It is important in introducing the charge into the annular space between the housing and the electrode that the charge cover at least about one-half and preferably up to three-quarters or more of the circumference along the open bottom edge of the housing and the interior surface of the side wall immediately adjacent thereto. For this reason, the openings of the charge shafts are located above the bottom edge of the housing so that the charge will be controlled to spread out laterally while descending into the furnace and thereby cover at least one-half of the bottom edge and adjacent interior surface of the side wall of the housing. Furthermore, the lower ends of the charging shafts are preferably flared outwardly to form pockets extending across a considerable portion of the circumference along the interior of the side wall whereby the charge is distributed laterally into the annular space across an area which is considerably greater than the cross-sectional area through the upper portions of the charging shafts. This also controls movement of the descending charge so that it will spread out laterally along the bottom edge and adjacent interior surface of the housing side wall. By controlling the introduction of charge in the manner described, it is possible to operate the furnace without substantial loss of furnace gas even though openings may be left between the charge and the bottom edge of the housing. Of course, the number and spacing of the charge shafts may be so selected that no openings remain between the charge and the bottom edge of the housing, but this is not actually necessary.

The gas housing and the electrode are suspended independently of each other so that the vertical position of one with respect to the other may be adjusted as desired. The elevation of the bottom edge of the housing relative to the exposed lower portion of the electrode controls how much of the electrode will be covered by charge. As the bottom edge is raised or lowered, the length of the exposed portion of the electrode covered with charge will correspondingly increase or decrease. Consequently, the height and pressure of the top layer of charge through which the furnace gases rise to reach the interior of the housing can be readily controlled.

The invention may be used with a single phase furnace having a single upper electrode as well as with a three phase system where a furnace is operated with three upper electrodes to which three phase alternating current is supplied.

Further details of the invention will be readily understood by reference to the accompanying drawings in which—

Figure 1:
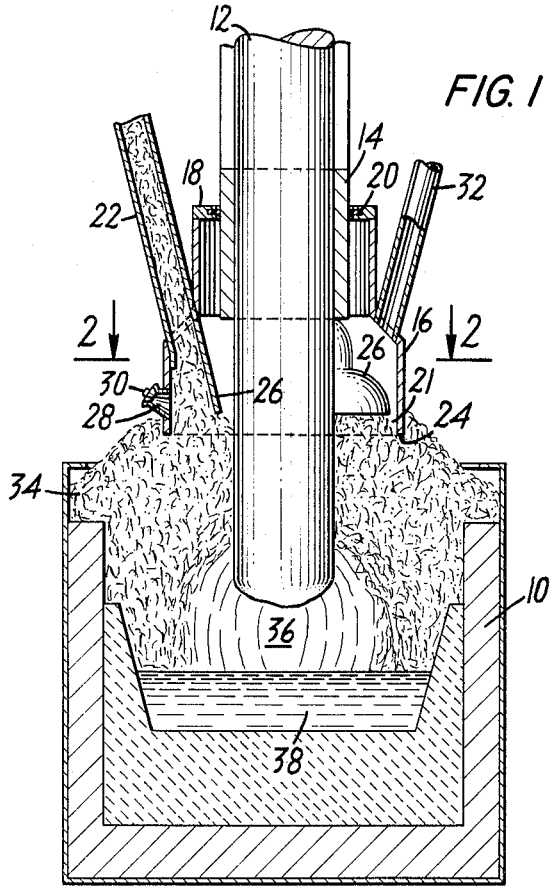
FIG. 1 is a vertical section of an electric smelting furnace equipped with a gas housing suitable for practicing the invention.

Referring to FIG. 1, reference numeral 10 there indicates an open electric smelting furnace with the usual upper electrode 12 suspended by the holder 14 through which electrical current is supplied to the electrode. The holder 14 is movable so that the electrode 12 may be raised or lowered into the opening of the furnace 10. Positioned around the electrode 12 is a gas housing 16 having a roof 18 which extends inwardly toward the holder 14. Sealing material 20 is interposed between the holder 14 and the inner edge of the roof 18 to prevent escape of furnace gas at this point.

Leading into the annular space 21 formed between the electrode and spaced side wall of the housing 16 is at least one charge shaft 22, there being illustrated specifically in the drawing. The charge shafts 22 extend almost but not all the way down to the bottom edge 24 of the housing 16 and flare out in their lower portions so as to form pockets 26 which are spaced uniformly from each other and which extend laterally across a considerable portion of the circumference of the interior wall of the housing 16. A pipe 28 leads into the pocket 26 of each charge shaft 22 to provide access for stoking tools and the pipe 28 is normally closed off by the lid 30. The pipes 28 are optional since if it is desired to stoke the furnace, the stoking tools can be readily inserted into the charge between the bottom edge of the housing and the rim of the furnace.

The housing 16 is also provided with three gas outlet pipes 32 which lead into the annular space 20 and which are positioned in alternate arrangement with the charge shafts 22 around the interior of the side wall of the housing 16. The entire housing 16 is suspended independently of the electrode 12 by conventional means (not shown) so that the bottom edge 24 may be raised or lowered in relation to the electrode 16. It is, of course, essential that the diameter across the bottom edge 24 of the housing 16 be greater than that of the electrode 12 but less than the diameter across the top opening of the furnace 10 in order that the annular space 20 and the charge introduced therein may provide the benefits of the invention.

In operating the furnace which has now been described, charge 34 is fed into the shafts 22 and the height of the bottom edge 24 of the housing is adjusted so that as the charge discharges from the pockets 26, it covers any desired portion of the length of the electrode 12 measuring from the bottom end thereof. As can be seen, the charge covers at least one-half of the circumference along the bottom edge 24 of the gas housing 16 and the interior surface of the side wall immediately adjacent thereto. A small amount of additional charge is also illustrated covering the exterior surface of the side wall of the housing 16 at the bottom end. This additional charge may, if desired, be supplied from outside the housing 16 to further seal the bottom edge 24 although it is not actually necessary.

As smelting progresses, a smelting crater 36 often forms between the lower end of the electrode 12 and the melt 38 at the bottom of the furnace 10. As can be seen, the charge 34 from the charging shafts 22 completely covers the smelting crater 36 and the increased pressure of the charge on the electrode 12 tends to prevent the formation of openings leading from the crater directly up into the gas housing 16. Thus, the path of the rising furnace gases generated in the vicinity of the smelting crater 36 leads up through the overlying cover of charge so that the heat content of the gases is effectively transferred to the incoming charge and the gases are cooled substantially by the time they are collected in the housing 16 and exhausted through the outlet pipes 32. The feed rate of the charge 34 to the shafts 22 is correlated to the rate that the charge sinks downwardly, as it is consumed during smelting, so that the smelting crater and the lower portion of the electrode are at all times covered by a layer of charge.

Figure 2:
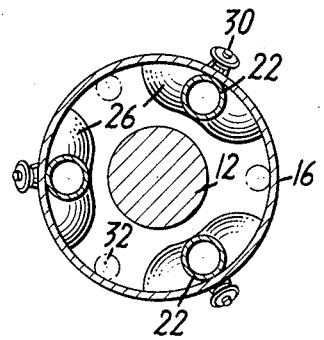
FIG. 2 is a section taken along line 2—2 of FIG. 1.
Figure 3:
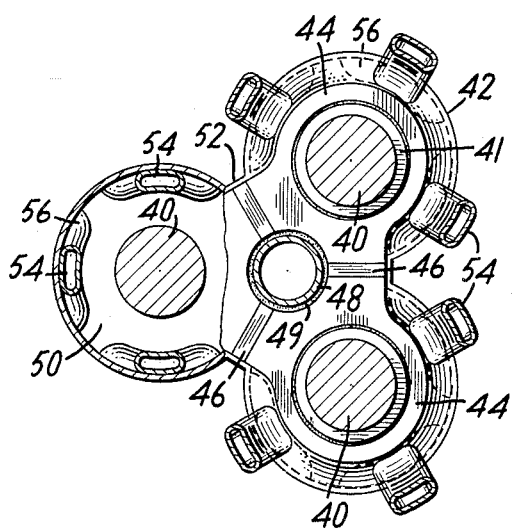
FIG. 3 is a view similar to FIG. 2, but partly in top plan and partly in section, showing the arrangement of the gas housing around the upper electrodes of a three phase system.

FIG. 3 illustrates the invention as applied to a three phase system in which the furnace utilizes three upper electrodes 40 to which is supplied three phase alternating current. While in such a system it is possible to use an independently suspended gas housing around each of the electrodes as has been described in connection with FIGS. 1 and 2, in many cases it is preferable with the three electrode furnace to use a single housing with its interior being common to all three electrodes and this is the form of structure illustrated in FIG. 3. Accordingly, the gas housing 42 shown in FIG. 3 has a side wall made up of three sections which are connected together to form a common interior and each electrode 40 is suspended by the holder 41 through the common roof 44 within each section of the single housing 42. The common roof 44 is separated by electrical insulation at 46 into three sections, corresponding to the three sections of the housing 42 within which the electrodes 40 are suspended, to prevent short circuiting and a gas outlet pipe 48, surrounded by sealing material 49, extends upwardly from the roof 44 in order to exhaust furnace gas from the common interior of the housing 42. The side wall of each connected section of the housing 42 forms an annular space 50 surrounding most of the surface of each electrode 40 except that inwardly, from the points of connection 52, the interior space within the housing becomes common to all three electrodes. As with the embodiment of FIGS. 1 and 2, a plurality of charging shafts 54 with the flared pockets 56 at the lower ends thereof lead into the annular space 50 of each electrode. The single housing 42 is suspended independently as a unit by conventional means (not shown) so that the common bottom edge of its three sections may be raised or lowered relative to the vertical positions of the electrodes 40. If desired, additional charging shafts 54 may be extended down into the central interior space of the housing 42, but this is not actually necessary.

Operation of the furnace illustrated in FIG. 3 is the same as has been described for the embodiment shown in FIGS. 1 and 2. The elevation of the bottom edge of the housing 42 is again adjusted to cover the desired length of the electrodes 40 and charge is introduced in a controlled manner into the annular spaces 50 so that at least one-half of the circumference along the bottom edges of the three sections and immediately adjacent interior wall surfaces are covered with charge. In this case, furnace gases will be collected from the smelting craters associated with all three electrodes 40 and exhausted out through common outlet pipe 48.

It will be understood that it is intended to cover all changes and modifications of the preferred embodiments of the invention, herein chosen for the purpose of illustration, which do not constitute departures from the spirit and scope of the invention.

What is claimed is:

1. The method of charging and of exhausting gas from an open electric furnace of the type used for smelting and the like having an upper electrode extending into the opening of a furnace pot and having a cylindrical housing positioned in spaced relationship around said electrode with the open bottom of said housing facing the opening of said furnace pot, which comprises the steps of feeding charge into the annular space between the housing and the electrode, adjusting the relative height of the bottom edge of the housing with respect to the electrode, without brining said bottom edge into direct contact with the furnace pot, so that the charge fed into the annular space will cover and press against a substantial portion of the exposed lower portion of the electrode down to the lower end thereof, maintaining at least about one-half of the circumference along said bottom edge of said housing in substantially continuous contact with charge which has been fed into said annular space, and exhausting gas from the housing as the gas moves up through the charge covering the electrode and collects in the housing, said gas exhaustion being carried out without atmospherically venting the gas in the vicinity of said housing.

2. A method in accordance with claim 1 in which additional charge is supplied to the furnace from outside of the housing to cover the bottom edge of the housing with charge.

3. A method of charging and of exhausting gas from an open electric furnace of the type used for smelting and the like having an upper electrode extending into the opening of a furnace pot and having a cylindrical housing positioned in spaced relationship around said electrode with the open bottom of said housing facing the opening of said furnace pot, which comprises the steps of feeding charge through at least one shaft leading into the annular space between the housing and the electrode but terminating short of the bottom edge of the housing, adjusting the relative height of the bottom edge of said housing, without bringing said bottom edge into direct contact with the furnace pot, so that the charge fed into the annular space will cover and press against a substantial portion of the exposed lower portion of the electrode measuring from the lower end thereof, maintaining at least about one-half of the circumference along said bottom edge of said housing in substantially continuous contact with charge which has been fed into said annular space, and exhausting gas through at least one opening leading out from the housing as the gas moves up through the charge covering the electrode and collects in the housing, said gas exhaustion being carried out without atmospherically venting the gas in the vicinity of said housing.

4. A method in accordance with claim 3 in which the charge is fed through a plurality of shafts leading into the annular space, said shafts being spaced uniformly around the housing.

5. A method in accordance with claim 3 in which the charge is fed through three shafts leading into the annular space and in which the gas is exhausted through three openings leading out from the housing, said shafts being flared outwardly at the lower ends into pockets covering an area greater than the cross sectional area of the upper ends of the shafts, and said shafts and openings being spaced uniformly and alternately around the housing.

6. A method in accordance with claim 5 in which additional charge is supplied to the furnace from outside of the housing to cover the bottom edge of the housing with charge.

References Cited by the Examiner
UNITED STATES PATENTS

| | | | |
|---|---|---|---|
| 1,496,232 | 6/24 | Klugh | 13—33 |
| 1,748,780 | 2/30 | Marshall | 13—33 |
| 1,807,090 | 5/31 | Pistor | 13—33 |
| 1,944,521 | 1/34 | Miguet et al. | 13—34 |
| 2,068,448 | 1/37 | Cox | 13—34 |
| 2,672,491 | 3/54 | Lamb | 13—33 X |
| 2,794,843 | 6/57 | Sem et al. | 13—33 |
| 2,857,444 | 10/58 | Sem et al. | 13—33 |
| 2,971,040 | 2/61 | Sem | 13—33 |

RICHARD M. WOOD, *Primary Examiner.*

JOSEPH V. TRUHE, *Examiner.*